(12) United States Patent
Kang et al.

(10) Patent No.: US 8,557,141 B2
(45) Date of Patent: Oct. 15, 2013

(54) GELLING AGENT, A LIQUID CRYSTAL GEL COMPRISING THE SAME, AND A LIQUID CRYSTAL DEVICE COMPRISING THE LIQUID CRYSTAL GEL

(75) Inventors: Dae-Ho Kang, Daejeon (KR); Min-Jin Ko, Daejeon (KR); Jae-Ho Cheong, Daejeon (KR); Bum-Gyu Choi, Daejeon (KR); Myung-Sun Moon, Daejeon (KR); Ki-Youl Lee, Daejeon (KR); Yun-Bong Kim, Daejon (KR)

(73) Assignee: LG Chem, Ltd., Seoul (KR)

( * ) Notice: Subject to any disclaimer, the term of this patent is extended or adjusted under 35 U.S.C. 154(b) by 143 days.

(21) Appl. No.: 12/999,958

(22) PCT Filed: Jun. 22, 2009

(86) PCT No.: PCT/KR2009/003338
§ 371 (c)(1),
(2), (4) Date: Apr. 8, 2011

(87) PCT Pub. No.: WO2009/154432
PCT Pub. Date: Dec. 23, 2009

(65) Prior Publication Data
US 2011/0187971 A1   Aug. 4, 2011

(30) Foreign Application Priority Data
Jun. 20, 2008   (KR) .................. 10-2008-0058437

(51) Int. Cl.
C09K 19/54   (2006.01)
C09K 19/52   (2006.01)
C07F 7/10   (2006.01)
G02F 1/133   (2006.01)

(52) U.S. Cl.
USPC .................. 252/299.5; 252/299.01; 556/419

(58) Field of Classification Search
CPC ........ C07F 7/0812; C07F 7/0818; C07F 7/10; C09K 19/406; C09K 19/54; C09K 2019/526
USPC ............. 252/299.01, 299.5; 428/1.1; 556/419
See application file for complete search history.

(56) References Cited

U.S. PATENT DOCUMENTS

2006/0183859 A1   8/2006   Fukuda et al.
2006/0275557 A1*  12/2006  Hisamitsu et al. ............. 428/1.1

FOREIGN PATENT DOCUMENTS

| JP | 06-009653 A | 1/1994 |
| JP | 08-092260 A | 4/1996 |
| JP | 2005-239604 A | 9/2005 |
| WO | WO 2005/080404 A1 | 9/2005 |

OTHER PUBLICATIONS

Caplus 1968: 443967.*
McCubbin et al: "Directed Metalation Route to Ferroelectric Liquid Crystals with a Chiral Fluorenol Core: The Effect of Restricted Rotation on Polar Order", J. Am. Chem. Soc. vol. 126, pp. 1161-1167 (2004).

* cited by examiner

*Primary Examiner* — Shean C Wu
(74) *Attorney, Agent, or Firm* — McKenna, Long & Aldridge, LLP

(57) ABSTRACT

The present invention relates to a novel gelling agent comprising of a silane-amide chemical structure, a liquid crystal gel comprising the same and a liquid crystal device comprising said liquid crystal gel.
The liquid crystal gel comprised of the novel gelling agent has excellent compatibility with other materials, and has excellent stability and solubility during manufacturing process of the same, and thus it can be applied to the production of a highly adaptable liquid crystal device.

8 Claims, 1 Drawing Sheet

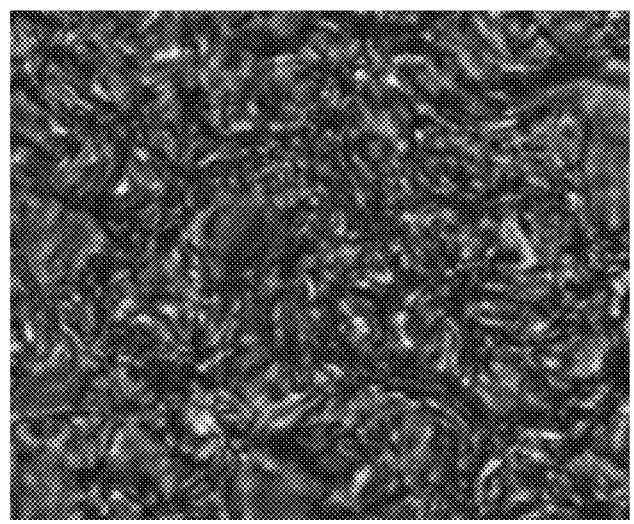

GELLING AGENT, A LIQUID CRYSTAL GEL COMPRISING THE SAME, AND A LIQUID CRYSTAL DEVICE COMPRISING THE LIQUID CRYSTAL GEL

This application is a 35 U.S.C. §371 National Stage entry of International Application No. PCT/KR2009/003338, filed on Jun. 22, 2009, and claims the benefits of Korean Patent Application No. 10-2008-0058437, filed on Jun. 20, 2008, all of which are hereby incorporated herein by reference for all purposes in their entirety.

TECHNICAL FIELD

The present invention relates to a novel gelling agent, a liquid crystal gel comprising the same, and a liquid crystal device comprising the liquid crystal gel.

PRIOR ART

Recently, many researches and developments about liquid crystal materials have been carried on to meet various needs. Particularly, various complexes in which the liquid crystal material is combined with another materials have been suggested so as to provide more improved characteristics to the liquid crystal material.

The concept of the liquid crystal gel was reported in 1990 for the first time, and the early liquid crystal gel adapted a polymer material forming a random network. However, recently the liquid crystal gel adapting a gelling agent having low molecular weight is suggested to provide more practical liquid crystal composition. Such gelling agent having low molecular weight is included in the liquid crystal gel with a content of less than 10 weight %, and it is very small amount in comparison with 30~50 weight % which is the content of the polymeric gelling agent. Such gelling agent having low molecular weight has an advantage of forming a fine fibrous associated body and dissipating the mobility of the liquid crystal at the same time just by adding a small amount of the same.

Furthermore, it has been reported that it is possible to simplify the process for fabricating the device and to control and improve the switching characteristics such as response time and the like, when the liquid crystal gel comprising said gelling agent having low molecular weight is applied to a switching device.

Meanwhile, the liquid crystal gel itself that is used in TN type must be suppressed in light scattering and the like, and must can lower the driving voltage and reduce the hysteresis phenomenon on gray-scale.

The liquid crystal material used in a polymer dispersed liquid crystal (PDLC) device, a kind of reflective liquid crystal display mode, is a complex with a polymeric material, and the liquid crystal display comprising the same has an advantage of uncalled for a polarizer and an alignment, and improved contrast ratio. However, it has a disadvantage of complicated preparing process of them, requiring the process of introducing the liquid material, sealing, and exposing the liquid crystal material.

Furthermore, the liquid crystal gel used in the PDLC must include a large quantity of the polymeric material and the thickness of it must be large enough at the same time to obtain a sufficient scattering strength, In addition, there is a problem of that the network structure is considerably restricted when the material is determined. Furthermore, it is difficult to obtain a network structure having consistent orientation because the network structure of the polymeric material usually grows irregularly, and thus it is also difficult to exhibit sufficient birefringence property because the liquid crystal content in a membrane is restrictive.

As disclosed above, a liquid crystal gel satisfying various characteristics is required according to the kinds of liquid crystal device, but the gelling agent having low molecular weight that can be applied to various liquid crystal gel is not suggested sufficiently yet. Therefore, the development for a gelling agent that can be applied to various liquid crystal gels with high compatibility with the other constituents and shows superior stability is continuously required.

DETAILED DESCRIPTION OF THE INVENTION

Technical Object

The present invention provides a novel gelling agent that has improved compatibility with the other constituents comprised in the liquid crystal gel and can be applied to various liquid crystal devices due to its excellent stability, a liquid crystal gel comprising the same, and a liquid crystal device comprising the liquid crystal gel.

Technical Solution

The present invention provides a novel gelling agent represented by the following Chemical Formula 1:

[Chemical Formula 1]

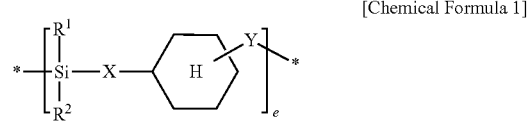

wherein, $R^1$ and $R^2$ are independently a $C_1$~$C_{30}$ alkyl, a $C_1$~$C_{30}$ alkoxy, —H, —OH, or a halogen;

ring H is a phenylene or a cyclohexylene unsubstituted or substituted by —F or —$CH_3$, and X and Y are connected to 1,4-, 1,3-, or 1,2-positions thereof;

Y is —C(=O)$NR^3$— or —$NR^3$C(=O)—;

X is said ring H, —$(CE_2)_p$-, —$(CE_2)_p$L-, —$(CE_2)_p$L$(CJ_2)_q$-, or —$(CE_2)_p$L$(CJ_2)_q$L-, wherein L is —O—, —$NR^3$—, —C=C—, or —C≡C—, $E_2$ and $J_2$ are independently $H_2$ or oxygen (O), and p and q are independently an integer of 0 to 20;

$R^3$ and $R^4$ are independently —H or a $C_1$~$C_{30}$ alkyl; and e is an integer of 1 to 5.

The present invention also provides a liquid crystal gel comprising the gelling agent and a compound having a mesogenic core as a liquid crystal material.

The present invention also provides a light adjusting layer comprising the liquid crystal gel, and a liquid crystal device comprising the light adjusting layer.

The liquid crystal gel according to the embodiment of the present invention comprised in the light adjusting layer of the liquid crystal device contains a liquid crystal material as an essential component, and the mobility of the liquid crystal material is dissipated, and the liquid material gelates as a whole and shows optical anisotropy at the same time, as a 3-dimensional basic network structure is formed by the action of the coexisting gelling agent.

Furthermore, the liquid crystal gel according to the embodiment of the present invention is reversible to heat, and it can become an isotropic solution by heating and can form the liquid crystal gel again by cooling. Therefore, the liquid crystal gel layer, that is to say the light adjusting layer, can be formed on a substrate just by coating a heated mixture solution of the liquid crystal material and the gelling agent on the substrate and cooling the same. Furthermore, the light adjusting layer is a gel type of which the mobility is substantially dissipated, and thus the preparing process of the liquid crystal device can be easily handled and simplified, and it provides with a wide range of choices in the substrate materials.

Furthermore, since the orientation state of the 3-dimensional network structure of the liquid crystal gel can be controlled by cooling and forming the gel while applying an electric field, it is possible to improve the contrast ratio or the viewing angle. In addition, the liquid crystal device according to the embodiment of the present invention shows the identical behavior as the prior PDLC devices, and uncalled for a polarizer and an alignment, and shows improved contrast ratio. Furthermore, it is possible to operate the device with a general-purpose operating circuit and a driving voltage low enough for practical use.

The gelling agent, the key material of the present liquid crystal gel, is superior in miscibility while selectively deteriorating or not deteriorating the optical anisotropy obtained by dissipating the mobility of the original liquid crystal material.

The gelling agent according to one embodiment of the present invention is the gelling agent represented by the following Chemical Formula 1:

[Chemical Formula 1]

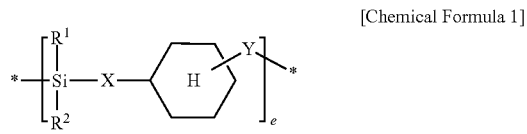

wherein,
R$^1$ and R$^2$ are independently a $C_1$~$C_{30}$ alkyl, a $C_1$~$C_{30}$ alkoxy, —H, —OH, or a halogen;
ring H is a phenylene or a cyclohexylene unsubstituted or substituted by —F or —CH$_3$, and X and Y are connected to 1,4-, 1,3-, or 1,2-positions thereof;
Y is —C(=O)NR$^3$— or —NR$^3$C(=O)—;
X is said ring H, —(CE$_2$)$_p$-, —(CE$_2$)$_p$L-, —(CE$_2$)$_p$L(CJ$_2$)$_q$-, or —(CE$_2$)$_p$L(CJ$_2$)$_q$L-, wherein L is —O—, —NR$^3$—, —C=C—, or —C≡C—, E$_2$ and J$_2$ are independently H$_2$ or oxygen (O), and p and q are independently an integer of 0 to 20;
R$^3$ and R$^4$ are independently —H or a $C_1$~$C_{30}$ alkyl; and
e is an integer of 1 to 5.

The gelling agent according to the embodiment forms a huge fibrous associated body by intermolecular interaction such as hydrogen bond between molecules, the huge fibrous associated bodies combine each other by van der Waals forces and the like and form a 3-dimensional network structure, and it is possible to lock up the liquid crystal material in the network structure.

According to the embodiment of the present invention, the gelling agent represented by the Chemical Formula 1 has superior mixing property and miscibility with the liquid crystal material, and it is possible to reduce the mobility of the liquid crystal effectively just by adding a small quantity of the same.

It is generally known that common gelling agents have an amide bond which is represented by —NHCO— and two or more alkylene groups in the molecule, wherein the carbon length (the number of carbons) of the alkylene group is 6 to 20 or more, and mostly the carbon length (then number of carbons) is 10 or more. However, the gelling agent having the silane and the aromatic amide group at the same time, like the compound of the present invention comprising the structure of Chemical Formula 1, is not known yet.

The gelling agent of the present invention represented by the Chemical Formula 1 comprises the aromatic amide group in the molecule, and thus intermolecular hydrogen bond can be formed by the amide group, and accordingly the interaction between the aromatic ring of the gelling agent of the present invention and the aromatic ring in the liquid crystal material is possible. Furthermore, the gelling agent according to the embodiment of the present invention is superior in miscibility with the liquid crystal material, because of the hydrogen bond due to the amide group and the interaction between the aromatic rings.

The gelling agent is characterized in that the intermolecular interaction can be properly controlled by comprising silicon group, and it has improved solubility to a solvent. Furthermore, it can gelate with the liquid crystal material when it comprises the alkylene group of $C_{10}$ or less in the molecule, and the miscibility becomes more excellent.

Furthermore, the liquid crystal material comprising the gelling agent represented by Chemical Formula 1 can form nematic phase or liquid phase by heating, as well as can be a form of physical gelling agent that can easily gelate by cooling. In addition to, the molecular structure is chemically stable and it shows stable gel-liquid transition reproducibility even during repetitive gelation and melting, by comprising Si—C bond in the molecule. On the contrary to this, when the chemical group for improving the processing property is excessively huge as in the case of a siloxane-based gelling agent comprising the other kinds of silicone bond, for example, Si—O—Si bond, the gelling force of the gelling agent is low, and particularly, when it is applied to a liquid crystal composition, the whitening point largely is lowered due to its low nematic property, the degree of orientation is deteriorated, and the whitening phenomenon is easily observed. Therefore, such gelling agent comprising the other kinds of silicone bond is distinguished from the gelling agent of the present invention.

Meanwhile, when R$^1$ and R$^2$ are independently a $C_1$~$C_6$ alkyl in Chemical Formula 1, the gelling agent can be easily synthesized and shows stable gel-liquid transition.

Meanwhile, it is preferable in the aspect of compatibility that the compound comprising the structure represented by the Chemical Formula 1 has the structure similar to mesogenic structure of the liquid crystal material comprised in the liquid crystal gel. According to another embodiment of the present invention, the compound of Chemical Formula 2 is provided as a nonrestrictive example of the compound comprising the structure of Chemical Formula 1, and the present invention is not limited to or by this:

[Chemical Formula 2]

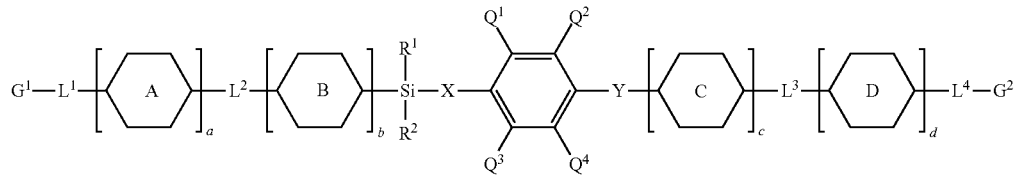

wherein, $R^1$ and $R^2$ are independently a $C_1$~$C_{30}$ alkyl, a $C_1$~$C_{30}$ alkoxy, —H, —OH, or a halogen;

$Q^1$ to $Q^4$ are independently —H, —F, or —CH$_3$;

Y is —C(=O)NR$^3$— or —NR$^3$C(=O)—;

X is phenylene, cyclohexylene, —(CE$_2$)$_p$-, —(CE$_2$)$_p$L-, —(CE$_2$)$_p$L(CJ$_2$)$_q$-, or —(CE$_2$)$_p$L(CJ$_2$)$_q$L—, wherein L is —O—, —NR$^3$—, —C=C—, or —C≡C—, E$_2$ and J$_2$ are independently H$_2$ or oxygen (O), and p and q are independently an integer of 0 to 20;

$R^3$ and $R^4$ are independently —H or a $C_1$~$C_{30}$ alkyl;

$G^1$ and $G^2$ are independently V,

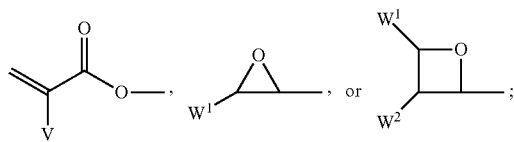

V is —W$^1$, —OW$^1$, —F, —Cl, —Br, —I, —CN, —CF$_3$, or —OCF$_3$;

W$^1$, W$^2$, and the following W$^3$, W$^4$, and W$^5$ are independently —H, a $C_1$~$C_{30}$ alkyl unsubstituted or substituted by fluorine, a $C_2$~$C_{30}$ alkenyl unsubstituted or substituted by fluorine, a $C_2$~$C_{30}$ alkynyl unsubstituted or substituted by fluorine, —(CH$_2$CH$_2$O)$_t$CH$_3$, —(CH$_2$CHCH$_3$O)$_t$CH$_3$, or —(CHCH$_3$CH$_2$O)$_t$CH$_3$, and t is an integer of 1 to 5;

L$^1$, L$^2$, L$^3$, and L$^4$ are independently selected from —(CH$_2$)$_r$SiW$^3$W$^4$(CH$_2$)$_s$—, —(CH$_2$)$_r$O(CH$_2$)$_s$—, —(CH$_2$)$_r$NW$^3$(CH$_2$)$_s$—, —(CH$_2$)$_r$S(CH$_2$)$_s$—, —(CH$_2$)$_r$SO(CH$_2$)$_s$—, —(CH$_2$)$_r$SO$_2$(CH$_2$)$_s$—, —(CH$_2$)$_r$—, —CH=CH—, —C≡C—, —C(=O)O(CH$_2$)$_r$—, —OC(=O)(CH$_2$)$_r$—, —(CH$_2$)$_r$C(=O)O—, —(CH$_2$)$_r$OC(=O)—, —C(=O)—, —C(=O)NW$^3$—, —NW$^3$C(=O)—, —C(=O)S—, and —SC(=O)—, and r and s are independently an integer of 0 to 10;

a, b, c, and d are an integer of 0 to 2; and ring A, ring B, ring C, and ring D are independently a $C_5$~$C_{20}$ cycloalkylene, a $C_5$~$C_{20}$ heterocycloalkylene, a $C_6$~$C_{20}$ arylene, or a $C_6$~$C_{20}$ heteroarylene, and each ring is unsubstituted or substituted by —W$^5$, —OW$^5$, —F, —Cl, —Br, —I, —CN, —CF$_3$, —OCF$_3$, —C(=O)W$^5$, —OC(=O)W$^5$, or —C(=O)OW$^5$.

Furthermore, the $C_1$~$C_{20}$ alkyl of W$^1$, W$^2$, W$^3$, W$^4$, and W$^5$ in Chemical Formula 2 may be a linear alkyl or a branched alkyl such as —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, and the like, for example. However, the present invention is not limited to or by this. Furthermore, the alkyl substituted by fluorine of W$^1$, W$^2$, W$^3$, W$^4$, and W$^5$ in Chemical Formula 2 may be the alkyl of which one or more hydrogen atoms are substituted by fluorine atoms.

Furthermore, the $C_2$~$C_{20}$ alkenyl of W$^1$, W$^2$, W$^3$, W$^4$, and W$^5$ in Chemical Formula 2 may be a linear alkenyl or a branched alkenyl such as —CH=CH$_2$, —CH=CHCH$_3$, —CCH$_3$=CH$_2$, —CH$_2$CH=CH$_2$, —CH=CHCH$_2$CH$_3$, —CH=C(CH$_3$)$_2$, —CCH$_3$=CHCH$_3$, —CH$_2$CH=CHCH$_3$, —CH$_2$CCH$_3$=CH$_2$, —CHCH$_3$CH=CH$_2$, —CH$_2$CH$_2$CH=CH$_2$, and the like, for example. However, the present invention is not limited to or by this. Furthermore, the alkenyl substituted by fluorine of W$^1$, W$^2$, W$^3$, W$^4$, and W$^5$ in Chemical Formula 2 may be the alkenyl of which one or more hydrogen atoms are substituted by fluorine atoms.

Furthermore, the $C_2$~$C_{20}$ alkynyl of W$^1$, W$^2$, W$^3$, W$^4$, and W$^5$ in Chemical Formula 2 may be a linear alkenyl or a branched alkynyl such as —C≡CH, —CH$_2$C≡CH, —C≡CCH$_3$, —CH$_2$CH$_2$C≡CH, —CHCH$_3$C≡CH, —CH$_2$C≡CCH$_3$, —C≡CCH$_2$CH$_3$, and the like, for example. However, the present invention is not limited to or by this. Furthermore, the alkynyl substituted by fluorine of W$^1$, W$^2$, W$^3$, W$^4$, and W$^5$ in Chemical Formula 2 may be the alkynyl of which one or more hydrogen atoms are substituted by fluorine atoms. At this time, $R^1$ and $R^2$ may preferably be a $C_1$~$C_6$ alkyl independently, X may be a single bond, and a and b may be 0 in Chemical Formula 2. Thus, it is advantageous in that it is possible to give good solubility to the aromatic amide group, in the case of the gelling agent where an aromatic amide bond at one side bond of Si, and alkyl and alkoxy groups are bonded to the remaining groups of Si.

Some examples of the gelling agent of Chemical Formula 2 may be 4-(dimethyl(pentyl)silyl)-N-phenyl 1,4-benzyl diamide; 4-((2-ethoxyethyl)dimethylsilyl)-N-phenyl 1,4-benzyl diamide; 4-((1,4-(phenyl dicarbamoyl)phenyl)dimethyl silyl) butyl arylate; N-(4-cyanophenyl)-4-(hexyldimethylsilyl)benzamide; 4-(butyldimethylsilyl)-2-fluoro-N-(4-((1s,4r)-4-propylcyclohexyl)phenyl)benzamide; 4-(butyldimethylsilyl)-N-(3,5-difluoro-4-(3,4,5-trifluorophenyl)phenyl)-2-methylbenzamide; 4-(4-(butyldimethylsilyl)cyclohexyl)-2,6-difluoro-N-(3,4,5-trifluorophenyl)benzamide; and 2,5-di-(4-(butyldimethylsilyl)-N-cyclohexylbenzamide) hexane hydrofuro[3,2-b]furan, but the compounds of the present invention are not limited to the examples. The structural formulae of above compounds are represented as follows.

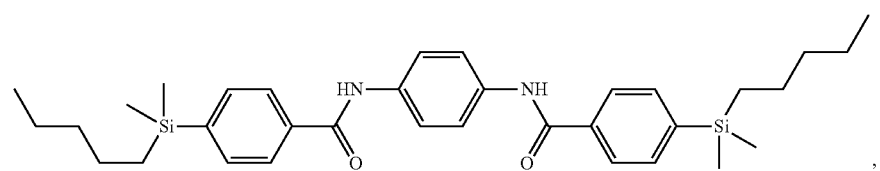
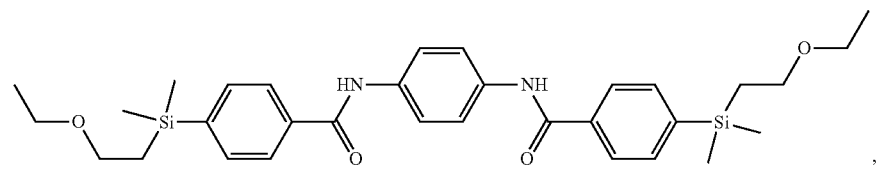
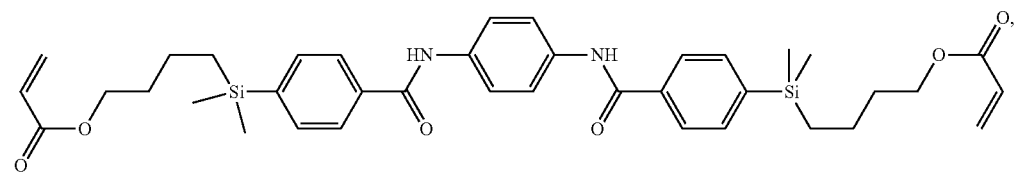
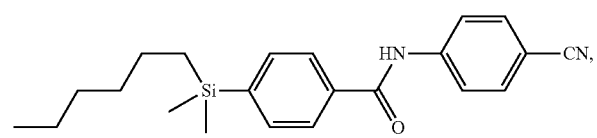
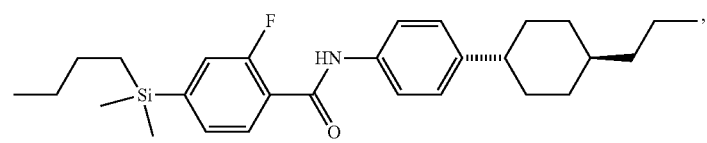
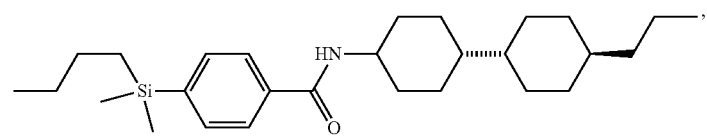
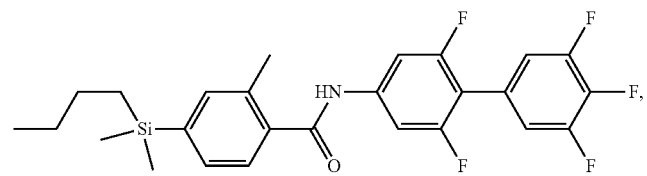
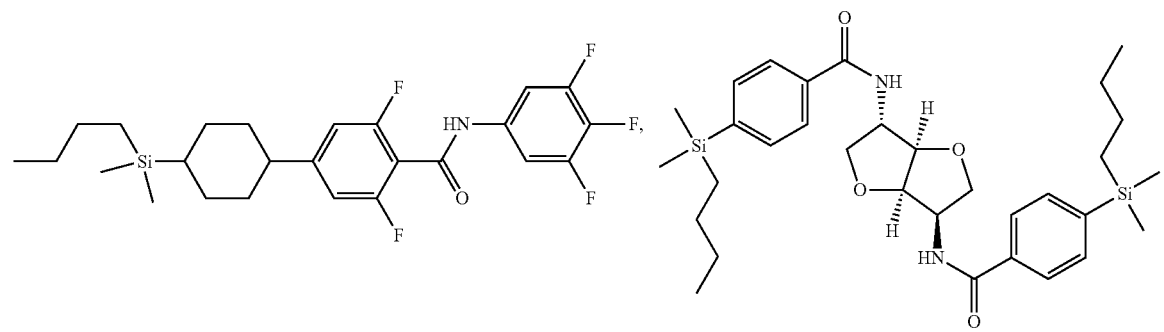

Meanwhile, according to still another embodiment of the present invention, the liquid crystal gel comprising said gelling agent and a liquid crystal material is provided. At this time, the liquid crystal material is not limited particularly. However, it is preferable that the liquid crystal material comprises one or more compounds having mesogenic core of Chemical Formula 3.

[Chemical Formula 3]

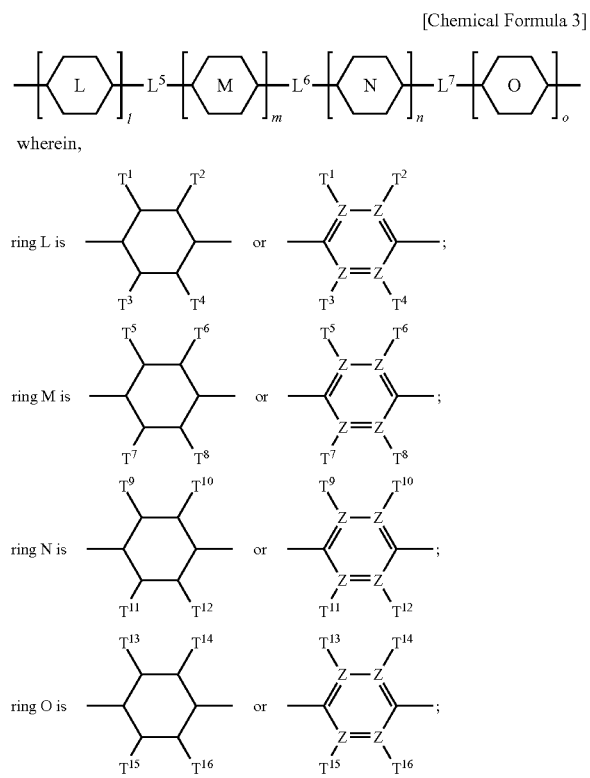

Z is C or N, and when Z is N, the corresponding bonds Z with any one of $T^1$ to $T^{16}$ do not exist;

$T^1$ to $T^{16}$ are independently —H, —F, —Cl, —Br, —I, —CN, —CF$_3$, —OCF$_3$, —R$^6$, —OR$^6$, —NHR$^6$, —NR$^6$R$^7$, —C(=O)R$^6$—SR$^6$, —SOR$^6$, —SO$_2$R$^6$, —C(=O)NHR$^6$, —C(=O)NR$^6$R$^7$, —NR$^6$C(=O)R$^2$, —C(=O)OR$^6$, —OC(=O)R$^6$, or —OC(=O)OR$^6$;

l, m, n, and o are independently an integer of 0 to 2, and l+m+n+o is an integer of 2 or more;

$L^5$, $L^6$, and $L^7$ are independently —O—, —NR$^8$—, —S—, —SO—, —SO$_2$—, —(CH$_2$)$_k$—, —CH=CH—, —C≡C—, —C(=O)O—, —OC(=O)—, —C(=O)—, —C(=O)NR$^8$—, —NR$^8$C(=O)—, —C(=O)S—, —SC(=O)—, —COO(CH$_2$)$_k$—, —OCO(CH$_2$)$_k$—, —(CH$_2$)$_k$OCO—, or —(CH$_2$)$_k$COO—, and k is an integer of 0 to 5; and R$^6$, R$^7$, and R$^8$ are independently —H, a C$_1$~C$_{20}$ alkyl unsubstituted or substituted by fluorine, a C$_2$~C$_{20}$ alkenyl unsubstituted or substituted by fluorine, a C$_2$~C$_{20}$ alkynyl unsubstituted or substituted by fluorine, —(CH$_2$CH$_2$O)$_j$CH$_3$, —(CH$_2$CHCH$_3$O)$_j$CH$_3$, or —(CHCH$_3$CH$_2$O)$_j$CH$_3$, and j is an integer of 1 to 5.

As more specific examples, various liquid crystalline molecules showing nematic or smectic phase is disclosed in 'Liquid Crystal Device Handbook' edited by the Japanese Scientific Promotion Association, 142nd Committee (1989), pages 154-192, 715-722. More specifically, a biphenyl-type molecule, a phenylcyclohexane-type molecule, a phenylpyridine-type molecule, and the like, or a mixture of two or more of these types of liquid crystal molecules can be used, but the present invention is not limited to or by this. It is also possible to use commercial liquid crystalline molecules such as liquid crystal mixture E7 (Merk), a kind of commercial liquid crystal composition, from Merk Co. Ltd. (Germany).

Furthermore, the usable liquid crystal material may preferably be a rod-like liquid crystal material. However, it can be mixed with a discotic liquid crystal compound or a liquid crystal polymer, according to the purpose.

Meanwhile, the gelling agent according to the embodiment of the present invention also can gelate common organic solvents. At this time, the kind of solvent is unrestricted, and thus commonly known organic solvents can be used. Furthermore, the amount of the gelling agent to the solvent is not limited particularly. However, the amount of the gelling agent may be not excess 100 parts by weight per 100 parts by weight of the solvent. Specifically, one or more solvents selected from toluene, xylene, alcohols, ethers, ketones, esters, hexane, chloromethane, chloroethane, and derivatives thereof can be used. Furthermore, the gelling agent comprised in the solvent may be 5 to 50 weight %, preferably. In the present invention, one or more chiral compounds can be comprised as a twisting agent in the liquid crystal gel or can be comprised as the chemical unit of the gelling agent compound as occasion demands. The mixing ratio of the chiral compound may be properly selected according to the mixing components, and it is not limited particularly. Specifically, the compound represented by the following Chemical Formula 4 is an example of the chiral compound, and one or more chiral compounds similar to this can be used. Furthermore, the amount of the chiral compound comprised in the liquid crystal gel may be less than 20 weight %, and it can be comprised in the molecular structure of the gelling agent as the chemical unit.

[Chemical Formula 4]

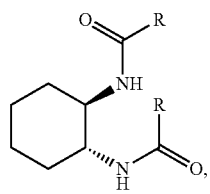

Here, R group of the chiral compound represented by Chemical Formula 4 is commonly a liquid crystalline structure comprising a mesogenic group composed of a bridge (i.e., an ester) structure with phenyl and hexyl, and a tail, an alkyl, or a derivative (i.e., an ether, a branch) thereof, but it is not limited to said substituent.

The mixing ratio of the gelling agent of the present invention comprised in the liquid crystal gel is not limited particularly and dependent on the kinds of the liquid crystal materials and the specific kinds of the gelling agents, however, it may be 0.1~30 weight %, and preferably 0.1~10 weight % in the total liquid crystal gel. When the content of the gelling agent is too small, it is difficult to form the gel effectively, and the uniformity may deteriorate, and when the content is excessively large, it may hinder the orientation of the liquid crystal and the temperature range.

The liquid crystal gel obtained from the liquid crystal material and the gelling agent can become a uniform liquid crystal or an isotropic solution by heating, and then can become the liquid crystal or the liquid crystal gel again by cooling.

Meanwhile, the present invention provides a light adjusting layer comprising the liquid crystal gel according to above embodiments, and a liquid crystal device comprising the light adjusting layer, as disclosed above. The structure of the liquid crystal device according to the embodiment can be same to the structure of prior liquid crystal devices comprising polymer dispersed liquid crystal as the light adjusting layer, but the present invention is not limited to the structure.

The light adjusting layer is supported by and installed between two sheets of substrate with an electrode layer, of which at least one are transparent. Here, a spacer may preferably be inserted between the two sheets of substrate for maintaining a gap, like prior liquid crystal devices. As a nonrestrictive example, the substrate may be a rigid material such as a glass, a metal, and the like, and can be made from a flexible material such as a plastic film, and the like. The two sheets of substrate face each other with a proper space therebetween.

Furthermore, at least one of the two substrates are transparent, however, the 'transparent' in here does not mean a perfect transparency and it is enough if the substrate has a transparency adapted to a purpose of the liquid crystal device.

When the liquid crystal device according to the embodiment works with the light passing through from one side of the device to the other side, the two sheets of substrate need to be quite transparent. Furthermore, the substrates may as well include a transparent electrode or an opaque electrode prepared on the entire or partial surface, according to the purpose.

Furthermore, when the liquid crystal device according to the embodiment is used to a computer terminal display, a projector display, and the like, it is preferable to install an active element to the electrode layer on the substrate.

The thickness of the light adjusting layer according to the embodiments may be adequately selected in the range of 3~50 μm according to the purpose of the liquid crystal device of the present invention, and preferably selected in the range of 20~50 μm to obtain a sufficient contrast ratio for using the property of that the light adjusting layer becomes opaque by light scattering.

The light adjusting layer of the liquid crystal device of the embodiment of the present invention can be formed just by simple fabrication processes of coating the isotropic solution which is a heated liquid crystal gel comprising the liquid crystal material and the gelling agent on the substrate with the electrode layer and the active element by using a coating device such as a spin coater, a bar coater, a roll coater, and the like, and cooling the same to the temperature range where the solution becomes the liquid crystal gel. And then, the device having a certain gap can be formed by using the spacer and the other substrate.

For example, the liquid crystal device according to the embodiment can be used for a screen to cut off the field of view such as a window for buildings or a show-window; a decorative display plate for advertisements; a display for a clock or electric calculator; a computer terminal display, a projector display, and the like, like a prior PDLC light adjusting layer. Furthermore, it can be applied to a reflective flexible display.

BRIEF DESCRIPTION OF THE DRAWINGS

FIG. 1 is a polarization microscope photo-image of non-oriented liquid crystal gel of Example 1.

EXAMPLES

Hereinafter, the present invention is explained in more detail by referring the following Examples. However, the Examples are just for presenting the present invention, and the present invention is not limited to or by them.

Example 1

Synthesis of Gelling Agent

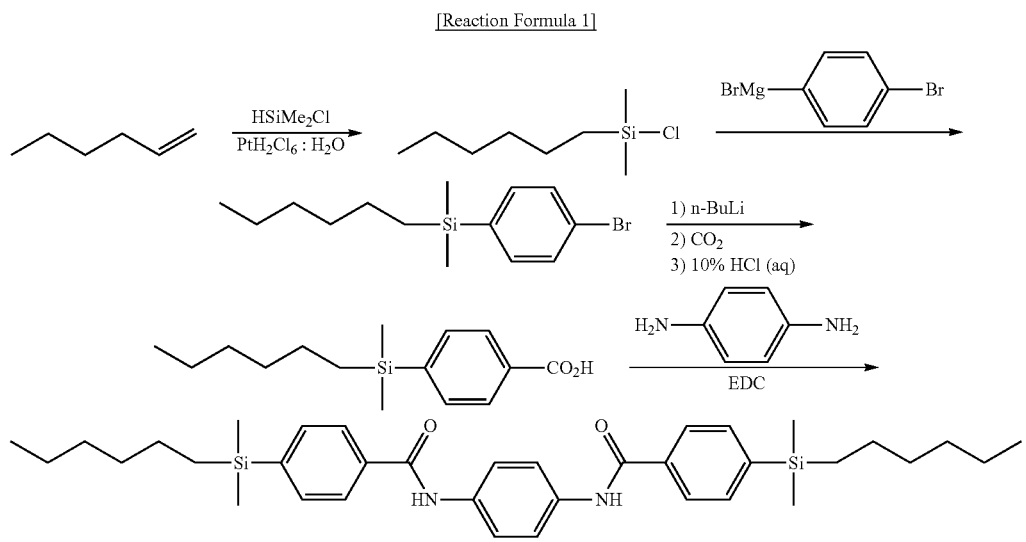

[Reaction Formula 1]

The gelling agent was synthesized according to Reaction Formula 1. The details are as follows.

1.0 equivalent of 1-Hexene was mixed with 4.0 equivalent of dimethylchlorosilane, and 0.1 equivalent of hydrogen hexachloroplatinate (IV) hydrate was introduced therein, and the mixture was reacted at 60 for about 1 hour.

After identifying that the vinyl peak disappears by using a crude NMR, the remaining dimethylchlorosilane was eliminated by vacuum distillation and a crude compound was obtained.

The compound was dissolved in anhydrous tetrahydrofurane (THF) and 1.0 equivalent of Grignard reagent was introduced therein, and the mixture was refluxed for about 10 hours. The mixture was worked up with 10% aq. HCl and ether after the reaction is completed, and a desired material was obtained with a yield of 85% after purifying with silica gel.

1.0 equivalent of the compound was dissolved in anhydrous tetrahydrofurane (THF) and 1.05 equivalent of n-butyl-lithium (n-BuLi) was introduced therein, and the mixture was stirred at −78 for about 2 hours so as to prepare an anion. Here, the mixture was worked up with 10% aq. HCl and ethyl acetate after bubbling with $CO_2$ gas for about 1 hour, and an acid compound was obtained with a yield of 80% by purifying with silica gel. 2.0 equivalent of the acid compound and 1.0 equivalent of p-phenylenediamine were dissolved in dichloromethane ($CH_2Cl_2$) solvent, 2.2 equivalent of ethylene dichloride (EDC) and 0.2 equivalent of dimethylaminopyridine (DMAP) were introduced therein, and the mixture was stirred for about 10 hours. After the reaction was completed, the final product was obtained with a yield of 70% by working up with water and separating with silica gel. $^1$HNMR data is as follows.

$^1$HNMR (400 MHz, $CDCl_3$): δ 0.31 (s, 12H), 0.72~0.83 (m, 4H), 0.92~1.10 (m, 6H), 1.26~1.43 (br, 12H), 1.60~1.71 (m, 4H), 7.61 (d, 4H), 7.66 (s, 4H), 7.86 (d, 4H), 8.14 (s, 2H).

Example 2

Synthesis of Gelling Agent silica gel column chromatography after working up with water and ether and eliminating the organic solvent. The silicone compound was dissolved in anhydrous tetrahydrofuran (THF) under a nitrogen atmosphere, and the temperature was lowered to −78. After preparing an anion by adding 1.0 equivalent of n-BuLi dropwise slowly therein and stirring the same for about 2 hours, the mixture was bubbled with $CO_2$ gas at −20 for about 1 hour. After elevating the temperature to room temperature, pH of the solution was adjusted to 1 by using aq. HCl. The acid compound was separated by using a silica gel after working up with water and ether and eliminating the organic solvent. After dissolving the acid compound in THF solvent, 1.1 equivalent of methane sulfonyl chloride (MsCl) and 1.2 equivalent of diisopropylethylamine were introduced therein at 0, and mesylate was prepared for about 30 minutes, and 1.2 equivalent of diisopropylethylamine, 0.2 equivalent of 4-dimethylaminopyridine (DMAP), and 1.0 equivalent of trans,trans-bicyclohexylamine were introduced therein and the mixture was stirred under the condition of room temperature and nitrogen atmosphere for about 20 hours, and the reaction was terminated. The final product was obtained by using a silica gel column chromatography after working up with water and ether and eliminating the organic solvent.

$^1$HNMR (400 MHz, $CDCl_3$): δ 0.08 (s, 6H), 0.61~0.65 (m, 2H), 0.88 (t, 6H), 0.90~1.38 (m, 12H), 1.49~1.56 (m, 5H), 1.75~1.83(m, 8H), 2.13~2.16 (br, 2H), 3.53 (m, 1H), 6.82 (br, 1H), 7.61 (d, 2H), 7.84 (d, 2H).

Fabrication of Liquid Crystal Device 5 weight % of the synthesized gelling agent was added to 95 weight of liquid crystal mixture E7 (Merk Co., Ltd., refer the following chemical formulae), and the liquid crystal gel

[Reaction Formula 2]

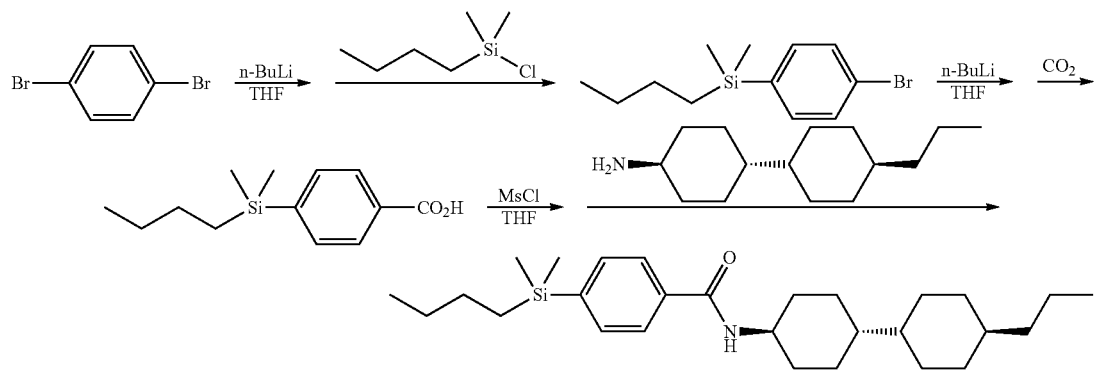

The gelling agent was synthesized according to Reaction Formula 2. The details are as follows.

1,4-dibromobenzene was dissolved in anhydrous tetrahydrofuran (THF) under a nitrogen atmosphere, and the temperature was lowered to −78. After preparing an anion by adding 1.0 equivalent of n-BuLi dropwise slowly therein and stirring the same for about 2 hours, 1.0 equivalent of chlorosilane was introduced therein. After slowly elevating the temperature to room temperature, the mixture was further stirred at room temperature for about 2 hours, and the reaction was terminated. The silicone compound was separated by a mixture was prepared by heating and stirring the same at 100 for 1 minute.

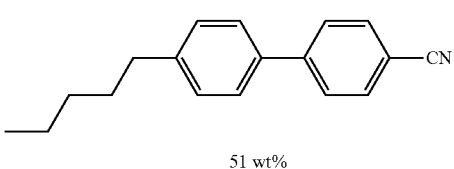

51 wt%

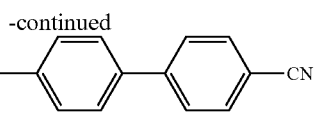

25 wt%

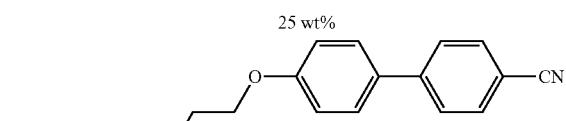

16 wt%

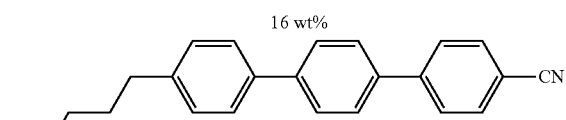

8 wt%

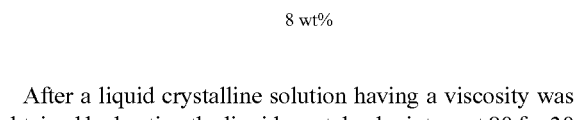

After a liquid crystalline solution having a viscosity was obtained by heating the liquid crystal gel mixture at 80 for 30 seconds, the liquid crystal gel was heated and contacted to the edge of the liquid crystal cell which had a uniform spacer gap of 5 μm and was aligned with imide TN of 1*1 cm ITO electrode area, under a vacuum condition. The liquid crystal gel was injected into the cell due to the low viscosity obtained by heating and a capillary phenomenon. The injected liquid crystal gel formed an oriented nematic gel between the two substrates through cooling process, and the liquid crystal device comprising the liquid crystal gel as the light adjusting layer was prepared.

Comparative Example 1

[Chemical Formula 5]

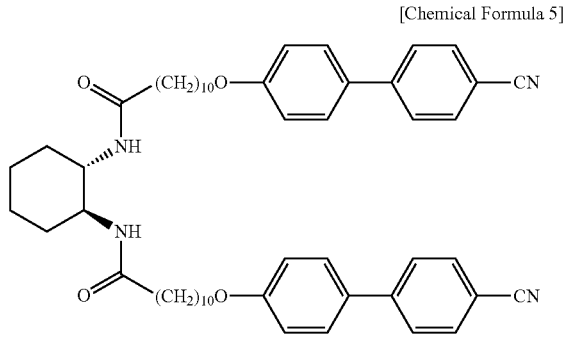

5 weight % of G1 (JSR) of Chemical Formula 5 which is known as a gelling agent in the prior patent publication (Japanese patent publication No. Hei 11-52341) was introduced to 95 weight % of liquid crystal mixture E7 (Merk Co., Ltd.), and the gelling agent was dissolved into the liquid crystal while heating and stirring the same at 150. However, there was sediment due to the decreased miscibility, and it was impossible to form a uniform liquid crystal gel due to this.

Comparative Example 2

5 μm TN cell was prepared according to the same method as in Example 1 except that 100 weight % of liquid crystal mixture E7 (Merk Co., Ltd.) was used.

Comparative Example 3

[Chemical Formula 6]

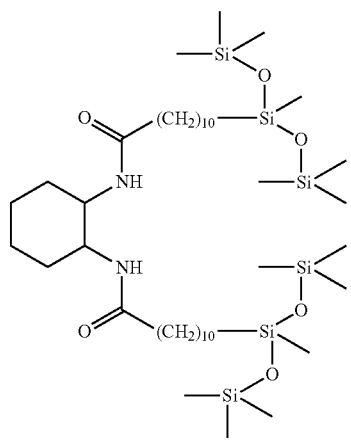

5 μm TN cell was prepared according to the same method as in Example 1 except that the compound of Chemical Formula 6 which is a comparative gelling agent comprising a siloxane structure based on the prior patent was used.

1. Evaluation of Liquid Crystal Device

It was difficult to fabricate the device by using the liquid crystal gel of Comparative Example 1 because of the sediment.

The liquid crystal gel of Comparative Example 3 could not be gelated in spite of long time cooling because of low gelling force of the gelling agent added in the liquid crystal gel, and the measurement was impossible because there was much orientation failure.

The driving voltage and the response time of the 5 μm TN liquid crystal devices prepared in Example 1 and Comparative Example 2 were measured as follows, and the results are disclosed as below. LCMS-150 apparatus (Sesim photonics Co., Ltd.) was used to evaluate the liquid crystal devices.

1-1) Driving Voltage

The driving voltage is arbitrarily defined as the voltage allowing strength of polarization of 4.9 V (98% of light transmittance limitation) which is detected by a photodiode, when voltage is applied to the device. It is for making the numeric comparison of the experimental examples easy.

1-2) Response Time

Response time represents the time to reach 98% light transmittance when the driving voltage is applied to the TN cell, and it means the reacting speed of the liquid crystal when the voltage is applied to the cell or interrupted, and it is represented by msec unit.

2. Results of the Experiments

The driving voltage of the liquid crystal device prepared in Example 1 was 5V and the response time of the same was 14 msec. On the other hand, the driving voltage of the liquid crystal device prepared in Comparative Example 2 was 4V and the response time of the same was 22 msec.

According to the results of the evaluation experiments of the liquid crystal devices, the liquid crystal device to which the liquid crystal gel comprising the new gelling agent of the present invention was applied is superior to prior gel compound in the miscibility, and shows the result of improving the response characteristic of the liquid crystal composition.

The preferable examples of the present invention are explained as disclosed above. However, the present invention is not limited to or by this, and numerous modifications and variations of the present invention are possible in light of the above teachings and the scope of the appended claims, and it is also included in the range of the present invention, obviously.

The invention claimed is:

1. A gelling agent selected from the group consisting of:
4-(dimethyl(pentyl)silyl)-N-phenyl 1,4-benzyl diamide;
4-((2-ethoxyethyl)dimethylsilyl)-N-phenyl 1,4-benzyl diamide;
4-((1,4-(phenyl dicarbamoyl)phenyl)dimethyl silyl)butyl arylate;
N-(4-cyanophenyl)-4-(hexyldimethylsilyl)benzamide;
4-(butyldimethylsilyl)-2-fluoro-N-(4-((1s,4r)-4-propylcyclohexyl)phenyl)benzamide;
4-(butyldimethylsilyl)-N-(3,5-difluoro-4-(3,4,5-trifluorophenyl)phenyl)-2-methylbenzamide;
4-(4-(butyldimethylsilyl)cyclohexyl)-2,6-difluoro-N-(3,4,5-trifluorophenyl)benzamide; and
2,5-di-(4-(butyldimethylsilyl)-N-cyclohexylbenzamide) hexane hydrofuro[3,2-b]furan.

2. A liquid crystal gel comprising a gelling agent represented by the following Chemical Formula 2 and a liquid crystal material:

[Chemical Formula 2]

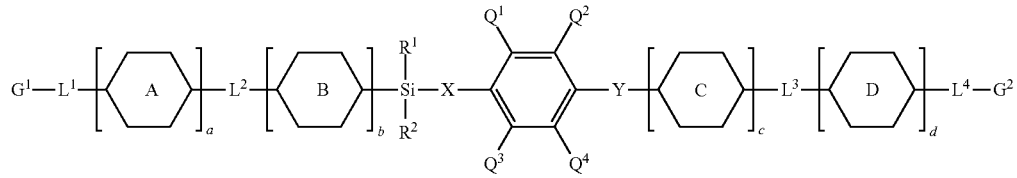

wherein,
$R^1$ and $R^2$ are independently a $C_1$~$C_{30}$ alkyl, a $C_1$~$C_{30}$ alkoxy, —H, —OH, or a halogen;
$Q^1$ to $Q^4$ are independently —H, —F, or —$CH_3$;
Y is —C(=O)$NR^3$— or —$NR^3$C(=O)—;
X is phenylene, cyclohexylene, —$(CE_2)_p$-, —$(CE_2)_p$L-, —$(CE_2)_p$L$(CJ_2)_q$-, or —$(CE_2)_p$L$(CJ_2)_q$L-,
wherein L is —O—, —$NR^3$—, —C=C—, or —C≡C—, $E_2$ and $J_2$ are independently $H_2$ or oxygen (O), and p and q are independently an integer of 0 to 20;
$R^3$ and $R^4$ are independently —H or a $C_1$~$C_{30}$ alkyl;
$G^1$ and $G^2$ are independently V,

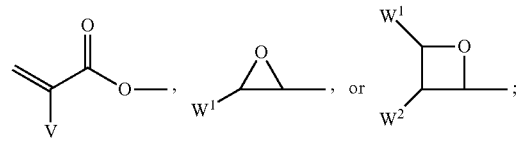

V is —$W^1$, —$OW^1$, —F, —Cl, —Br, —I, —CN, —$CF_3$, or —$OCF_3$;
$W^1$, $W^2$, and the following $W^3$, $W^4$, and $W^5$ are independently —H, a $C_1$~$C_{30}$ alkyl unsubstituted or substituted by fluorine, a $C_2$~$C_{30}$ alkenyl unsubstituted or substituted by fluorine, a $C_2$~$C_{30}$ alkynyl unsubstituted or substituted by fluorine, —$(CH_2CH_2O)_tCH_3$, —$(CH_2CHCH_3O)_tCH_3$, or —$(CHCH_3CH_2O)_tCH_3$, and t is an integer of 1 to 5;
$L^1$, $L^2$, $L^3$, and $L^4$ are independently selected from —$(CH_2)_r$Si$W^3W^4(CH_2)_s$—, —$(CH_2)_rO(CH_2)_s$—, —$(CH_2)_rNW^3(CH_2)_s$—, —$(CH_2)_rS(CH_2)_s$—, —$(CH_2)_rSO(CH_2)_s$—, —$(CH_2)_rSO(CH_2)_s$—, —$(CH_2)_r$—, —CH=CH—, —C≡C—, —C(=O)O$(CH_2)_r$—, —OC(=O)$(CH_2)_r$—, —$(CH_2)_rC(=O)O$—, —$(CH_2)_rOC(=O)$—, —C(=O)—, —C(=O)$NW^3$—, —$NW^3C(=O)$—, —C(=O)S—, and —SC(=O)—, and r and s are independently an integer of 0 to 10;
a, b, c, and d are an integer of 0 to 2; and
ring A, ring B, ring C, and ring D are independently a $C_5$~$C_{20}$ cycloalkylene, a $C_5$~$C_{20}$ heterocycloalkylene, a $C_6$~$C_{20}$ arylene, or a $C_6$~$C_{20}$ heteroarylene, and each ring is unsubstituted or substituted by —$W^5$, —$OW^5$, —F, —Cl, —Br, —I, —CN, —$CF_3$, —$OCF_3$, —C(=O)$W^5$, —OC(=O)$W^5$, or —C(=O)$OW^5$.

3. The liquid crystal gel according to claim 2, wherein the liquid crystal material comprises mesogenic core having compound represented by the following Chemical Formula 3:

[Chemical Formula 3]

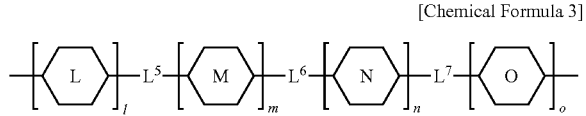

wherein,

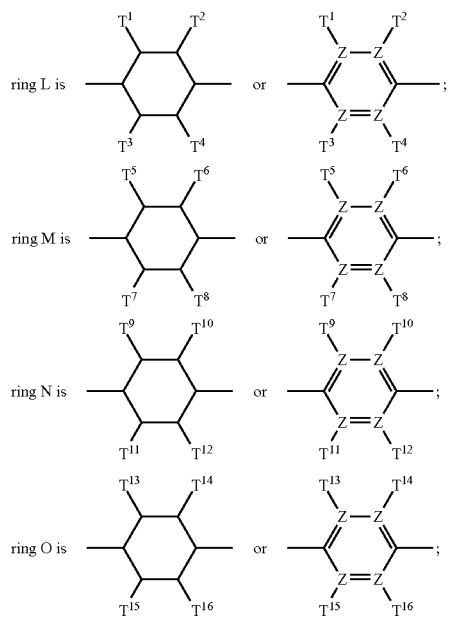

Z is C or N, and when Z is N, the corresponding bonds Z with any one of $T^1$ to $T^{16}$ do not exist;

$T^1$ to $T^{16}$ are independently —H, —F, —Cl, —Br, —I, —CN, —CF$_3$, —OCF$_3$, —R$^6$, —OR$^6$, —NHR$^6$, —NR$^6$R$^7$, —C(=O)R$^6$, —SR$^6$, —SOR$^6$, —SO$_2$R$^6$, —C(=O)NHR$^6$, —C(=O)NR$^6$R$^7$, —NR$^6$C(=O)R$^2$, —C(=O)OR$^6$, —OC(=O)R$^6$, or —OC(=O)OR$^6$;

l, m, n, and o are independently an integer of 0 to 2, and l+m+n+o is an integer of 2 or more;

$L^5$, $L^6$, and $L^7$ are independently —O—, —S—, —SO—, —SO$_2$—, —(CH$_2$)$_k$—, —CH=CH—, —C≡C—, —C(=O)O—, —OC(=O)—, —C(=O)—, —C(=O)NR$^8$—, —NR$^8$C(=O)—, —C(=O)S—, —SC(=O)—, —COO(CH$_2$)$_k$—, —OCO(CH$_2$)$_k$—, —(CH$_2$)$_k$OCO—, or —(CH$_2$)$_k$COO—, and k is an integer of 0 to 5; and $R^6$, $R^7$, and $R^8$ are independently —H, a $C_1$~$C_{20}$ alkyl unsubstituted or substituted by fluorine, a $C_2$~$C_{20}$ alkenyl unsubstituted or substituted by fluorine, a $C_2$~$C_{20}$ alkynyl unsubstituted or substituted by fluorine, —(CH$_2$CH$_2$O)$_j$CH$_3$, —(CH$_2$CHCH$_3$O)$_j$CH$_3$, or —(CHCH$_3$CH$_2$O)$_j$CH$_3$, and j is an integer of 1 to 5.

4. The liquid crystal gel according to claim 2, comprising the gelling agent in an amount of 0.1 to 30 weight %.

5. A light adjusting layer, comprising the liquid crystal gel according to claim 2.

6. A liquid crystal device, comprising the light adjusting layer according to claim 5.

7. The liquid crystal device according to claim 6, wherein the light adjusting layer is positioned between two sheets of substrate with an electrode layer.

8. The liquid crystal device according to claim 6, wherein the liquid crystal device is used in a screen to cut off the field of view, a decorative display plate for advertisements; a display for a clock or electric calculator; a computer terminal display, a projector display, or a reflective flexible display.

* * * * *